(12) United States Patent
Song (10) Patent No.: US 10,556,563 B2
(45) Date of Patent: Feb. 11, 2020

(54) HEADREST AIRBAG FOR VEHICLE

(71) Applicants: Hyundai Motor Company, Seoul (KR); Kia Motors Corporation, Seoul (KR)

(72) Inventor: Ki Dong Song, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 27 days.

(21) Appl. No.: 15/962,554

(22) Filed: Apr. 25, 2018

(65) Prior Publication Data

US 2019/0176739 A1    Jun. 13, 2019

(30) Foreign Application Priority Data

Dec. 8, 2017    (KR) .................. 10-2017-0168659

(51) Int. Cl.
*B60R 21/207* (2006.01)
*B60R 21/231* (2011.01)
*B60R 21/2338* (2011.01)

(52) U.S. Cl.
CPC ........ *B60R 21/207* (2013.01); *B60R 21/2338* (2013.01); *B60R 21/23138* (2013.01); *B60R 2021/2074* (2013.01); *B60R 2021/23107* (2013.01); *B60R 2021/23146* (2013.01); *B60R 2021/23161* (2013.01); *B60R 2021/23382* (2013.01)

(58) Field of Classification Search
CPC ............ B60R 21/207; B60R 21/23138; B60R 21/2338; B60R 2021/2074
See application file for complete search history.

(56) References Cited

U.S. PATENT DOCUMENTS

| | | | | |
|---|---|---|---|---|
| 5,904,405 A | * | 5/1999 | Wu .................. | B60N 2/885 297/391 |
| 6,120,099 A | * | 9/2000 | Reikerås et al. ....... | B60N 2/809 297/391 |
| 6,158,812 A | * | 12/2000 | Bonke ............... | B60R 16/08 297/391 |
| 7,150,468 B2 | * | 12/2006 | Pan ................. | B60R 21/207 280/730.1 |
| 8,985,622 B1 | * | 3/2015 | Cannon .............. | B60R 21/231 280/730.2 |
| 9,446,694 B2 | * | 9/2016 | Szczygiel .......... | B60N 2/885 |

(Continued)

FOREIGN PATENT DOCUMENTS

| | | | | |
|---|---|---|---|---|
| EP | 1193141 A2 | * | 4/2002 | ......... B60R 21/207 |
| JP | 08175309 A | * | 7/1996 | ......... B60R 21/207 |

(Continued)

*Primary Examiner* — Faye M Fleming (74) *Attorney, Agent, or Firm* — Mintz Levin Cohn Ferris Glovsky and Popeo, P.C.; Peter F. Corless (57) ABSTRACT

A headrest airbag for a vehicle is provided. The headrest airbag has an airbag cushion that is deployed forward from a headrest to surround an occupant's head which minimizes the occupant's head movement by holding the occupant's head in advance thus protecting the occupant's head against impact. Further, a rear cushion is deployed backward from the headrest, whereby both a front seat occupant and a rear seat occupant are safely protected from impact by preventing an injury caused when the rear seat occupant hits the front seat.

14 Claims, 6 Drawing Sheets

(56) References Cited

U.S. PATENT DOCUMENTS

| 10,202,095 B2 * | 2/2019 | Ohno | B60R 21/231 |
| 2014/0327234 A1 * | 11/2014 | Heurlin | B60R 21/207 |
| | | | 280/730.1 |

FOREIGN PATENT DOCUMENTS

| JP | 11034711 A * | 2/1999 | B60N 2/888 |
| JP | 2015013553 A * | 1/2015 | |
| KR | 10-2013-0031066 | 3/2013 | |

* cited by examiner

HEADREST AIRBAG FOR VEHICLE

CROSS REFERENCE TO RELATED APPLICATION

The present application claims priority to Korean Patent Application No. 10-2017-0168659, filed Dec. 8, 2017, the entire contents of which is incorporated herein for all purposes by this reference.

BACKGROUND

Field of the Invention

The present invention relates to a headrest airbag for a vehicle, and more particularly, to a headrest airbag that safely protect an occupant's head in the event of a vehicle collision.

Description of the Related Art

Techniques for ensuring safety of occupants are being developed in addition to driving performance, convenience, and functionality of a vehicle. Particularly, among various safeguards being applied to a vehicle, an airbag is being applied as an effective means for protecting occupants from impact. The airbag specifically protects a driver and occupants in the event of a vehicle collision, and typically includes: a collision sensor configured to detect a collision of the vehicle; a controller configured to operate the airbag based on a detection result of the collision sensor; and an airbag module configured to operate the airbag based on a signal of the controller. The airbag may be categorized as a driver airbag, a passenger airbag, a side airbag, a roof airbag, etc., based on installation position of the airbag.

However, during an oblique collision in a diagonal direction in addition to a frontal collision and a side collision during a vehicle collision, a head escapes from between the driver's seat airbag and the curtain airbag, and thus, impact may not be absorbed or unintentional tilting of the head may occur (e.g., the head may be thrust forward or backward). Further, when a vehicle is overturned, an occupant's head may collide with another occupant's head due to inertia, or may hit a crash pad, resulting in a serious injury. However, since a conventional airbag alone is insufficient to restrain an occupant's head from being moved excessively, there is a limit to safely protect an occupant from impact.

The foregoing is intended merely to aid in the understanding of the background of the present invention, and is not intended to mean that the present invention falls within the purview of the related art that is already known to those skilled in the art.

SUMMARY

Accordingly, the present invention provides a headrest airbag for a vehicle that safely protects an occupant's head from impact in the event of a vehicle collision and to prevent bending or thrusting of a head.

According to one aspect of the present invention, a headrest airbag for a vehicle may include: a pair of airbag cushions disposed in a headrest, deployed forward from opposite sides of an occupant's head by being supplied with gas from an inflator, and having front end portions thereof protrude to face each other when deployed.

Each of the airbag cushions may include: an outer chamber disposed at a side of the occupant's head when deployed by being supplied with the gas from the inflator; and an inner chamber disposed in a front end portion of the outer chamber, deployed by being supplied with the gas from the outer chamber, and disposed in front of the occupant's head when deployed. The outer chamber may include a plurality of sealing portions that extend in forward and backward directions and spaced apart from each other in a vertical direction. A diaphragm may be disposed between the outer chamber and the inner chamber, and the diaphragm may include at least one communication aperture.

The inner chamber may include a plurality of inner tethers on an inner surface thereof to limit inflation of the inner chamber by being connected to the diaphragm. The plurality of inner tethers may be spaced apart from each other in the forward and backward directions, and lengths of the inner tethers may be gradually increased in order from a rear inner tether to a front inner tether. The inner chamber may be disposed at a front end portion thereof with a vent aperture that communicates with an outside, and the inner chamber may include a closing membrane configured to close the vent aperture, and a pulling tether with a first end thereof connected to the closing membrane and a second end thereof connected to the diaphragm, and thus, the vent aperture may be closed by the closing membrane being pulled when the inner chamber is inflated.

Each of the airbag cushions may further include an inner support tether having a first end thereof connected to an outer surface of the inner chamber and a second end thereof fixed to the headrest, thereby providing a pulling force such that the inner chamber is pulled toward an occupant side when the airbag cushion is inflated. Additionally, each of the airbag cushions may include an outer support tether having a first end thereof connected to an outer surface of the outer chamber and a second end thereof fixed to the headrest, thereby providing a pulling force such that the outer chamber is pulled toward an occupant side when the airbag cushion is inflated.

The headrest airbag may further include a housing disposed in the headrest, with the inflator and the airbag cushions provided therein, wherein the inflator may be disposed in a center inside the housing, the airbag cushions may be disposed at inner opposite sides of the housing, and a gas passage that extends from the inflator may be connected to the airbag cushions. The housing may include a guide portion that extends forward, with a front portion of the guide portion being open.

The headrest airbag may further include a rear cushion disposed at a rear end portion of the housing, communicating with the gas passage to be supplied with the gas from the inflator, and being configured to be deployed backward from the headrest. The rear cushion may include at least one fixed tether having a first end connected to an inner surface of the rear cushion and a second end thereof connected to the rear end portion of the housing, thereby limiting inflation of the rear cushion. The rear cushion may include an aperture (e.g., a through-hole) at each of opposite ends thereof configured to communicate with the outside to discharge the gas therethrough. The gas passage may have a portion thereof that extends toward the airbag cushions and is formed to be wide and a portion thereof that extends toward the rear cushion and is formed to be narrow.

According to the headrest airbag for a vehicle configured as described, since the airbag cushion may be deployed forward from the headrest to surround an occupant's head, the occupant's head movement may be minimized by holding the occupant's head in advance, and the occupant's head may be protected against impact. Further, since the rear cushion may be deployed backward from the headrest, both a front seat occupant and a rear seat occupant may be safely protected from impact by preventing an injury caused when the rear seat occupant hits the front seat.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinbelow, a headrest airbag for a vehicle according to exemplary embodiments of the present invention will be described in more detail with reference to the accompanying drawings.

Figure 1:
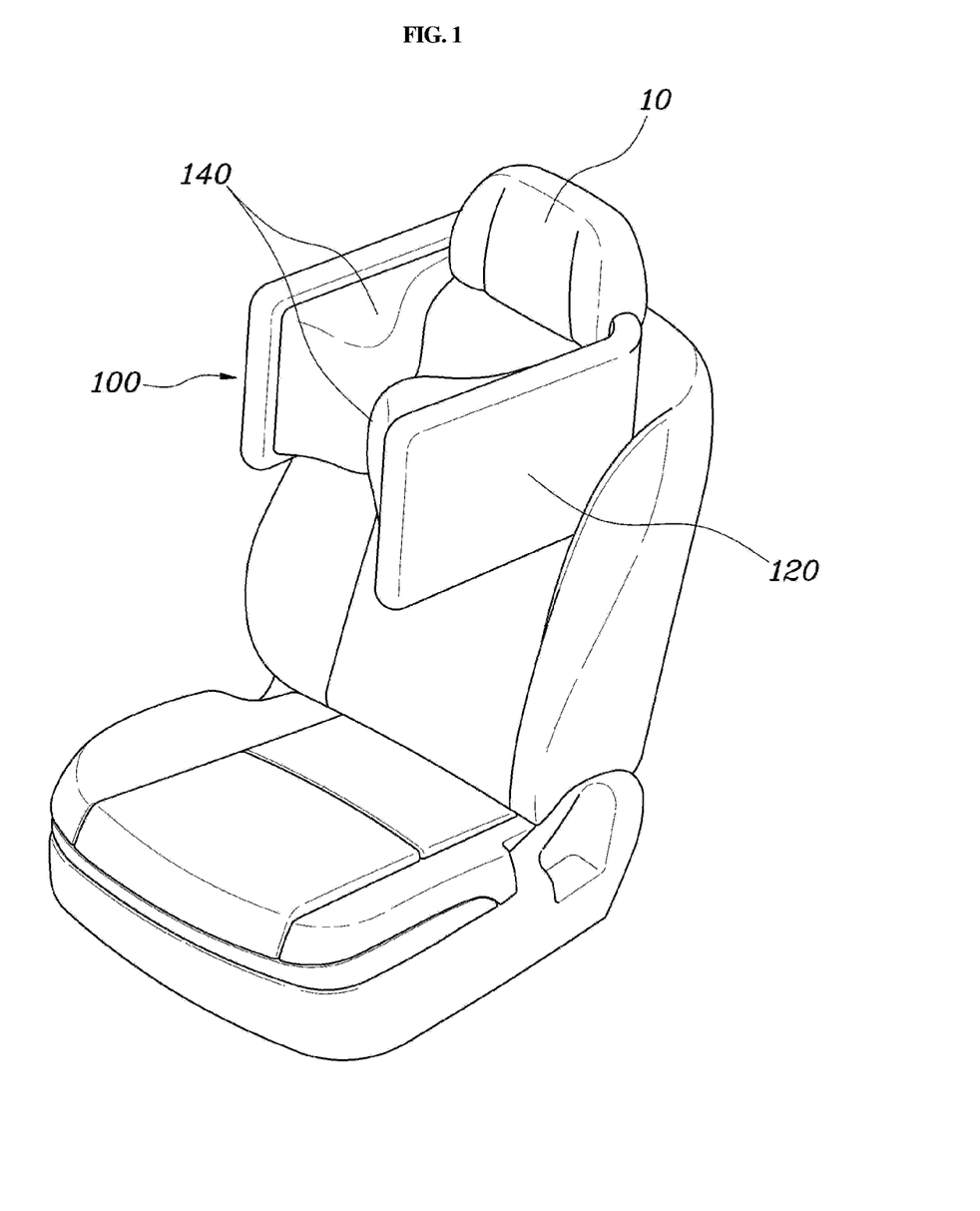
FIG. 1 is a view showing a headrest airbag for a vehicle according to an exemplary embodiment of the present invention.
Figure 2:
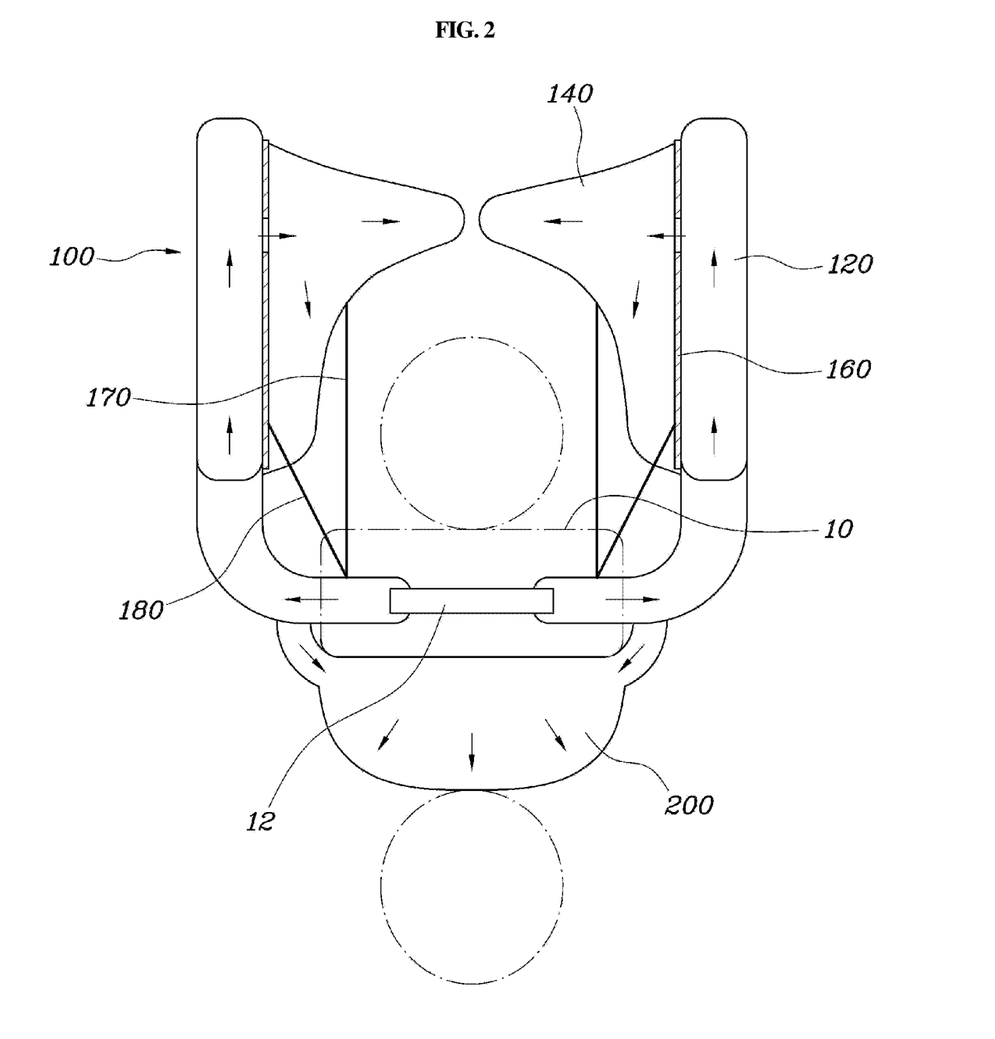
FIGS. 2 to 3 are views showing the headrest airbag for a vehicle shown in FIG. 1 according to an exemplary embodiment of the present invention.
Figure 3:
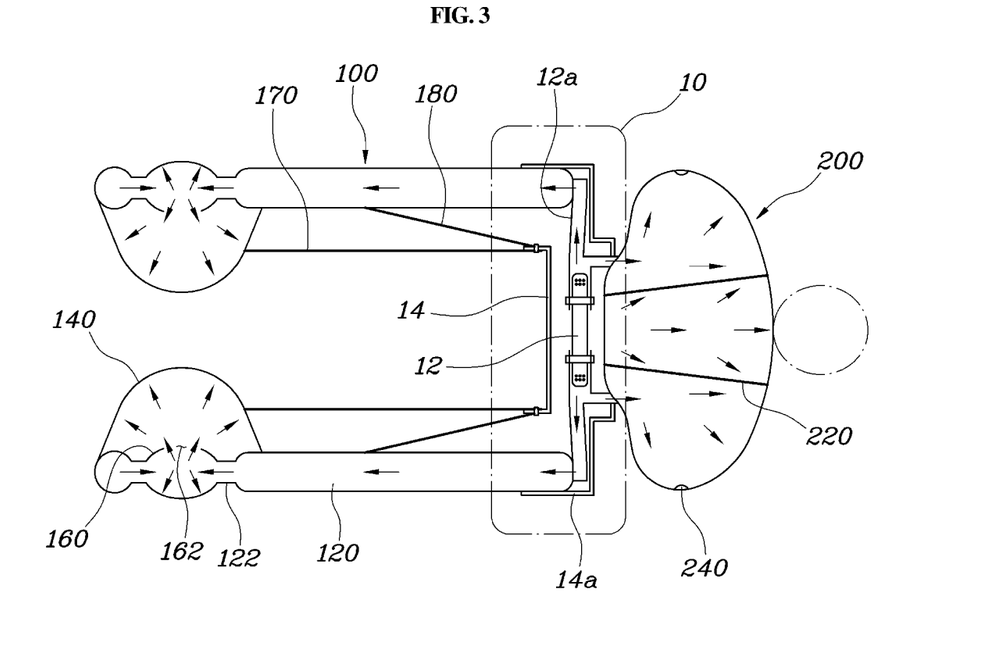
Figure 4:
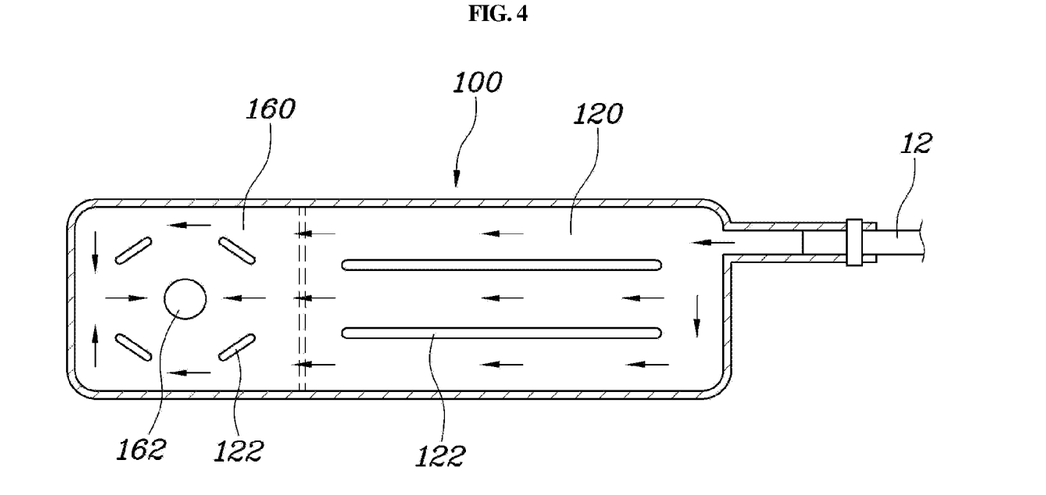
FIG. 4 is a view showing an outer chamber according to the headrest airbag for a vehicle shown in FIG. 1 according to an exemplary embodiment of the present invention.
Figure 5:
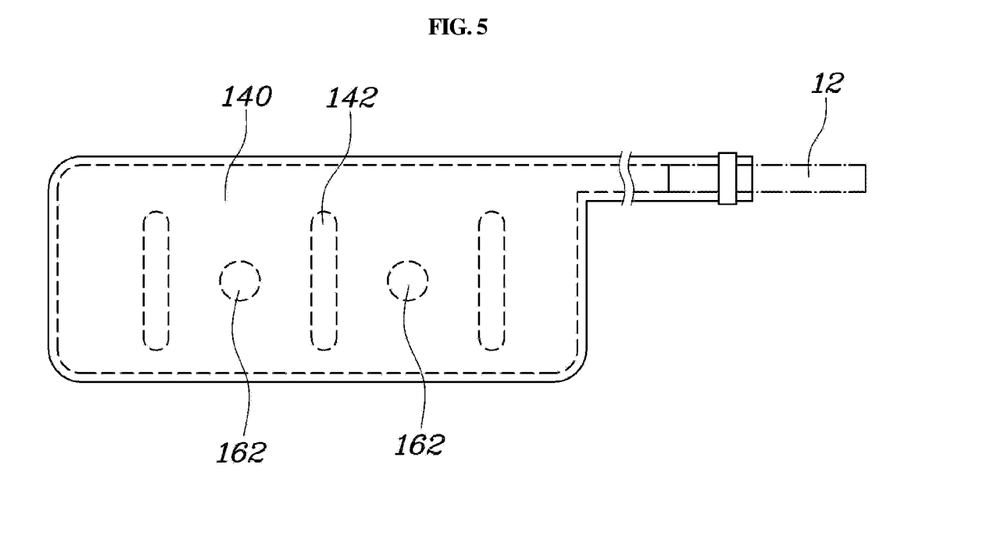
FIGS. 5 to 7 are views showing an inner chamber according to the headrest airbag for a vehicle shown in FIG. 1 according to an exemplary embodiment of the present invention.
Figure 6:
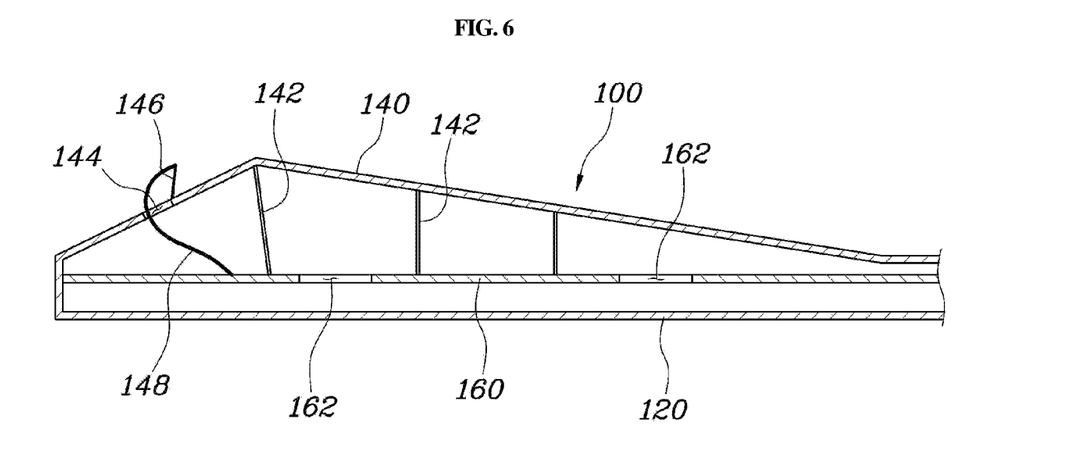
Figure 7:
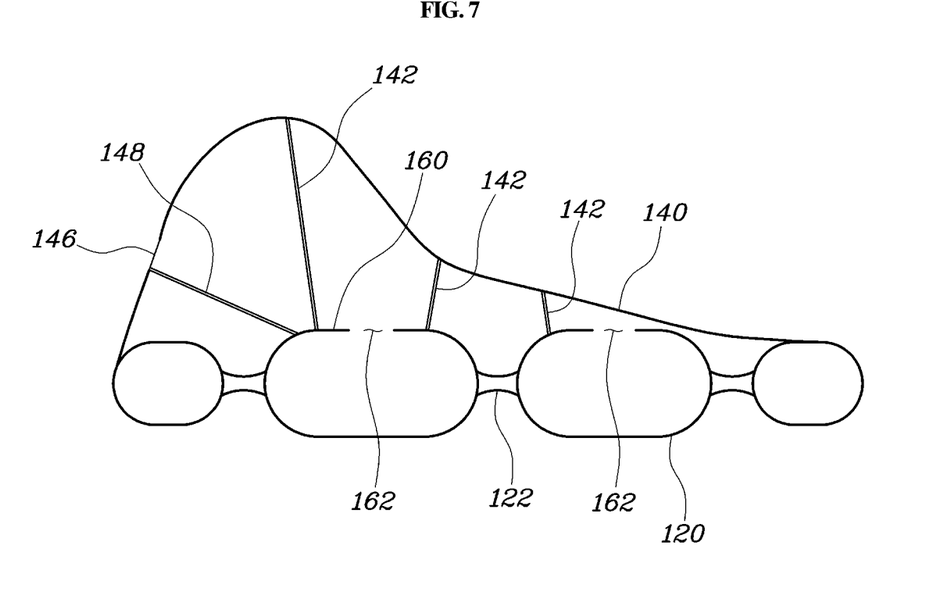
Figure 8:
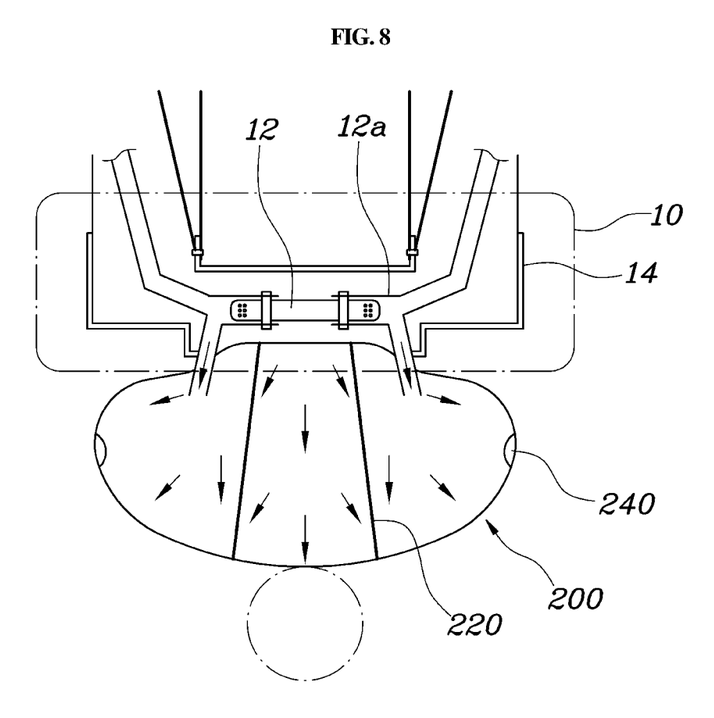
FIG. 8 is a view showing a rear cushion of the headrest airbag for a vehicle shown in FIG. 1 according to an exemplary embodiment of the present invention.

FIG. 1 is a view showing a headrest airbag for a vehicle according to an exemplary embodiment of the present invention; FIGS. 2 to 3 are views showing the headrest airbag for a vehicle shown in FIG. 1; FIG. 4 is a view showing an outer chamber according to the headrest airbag for a vehicle shown in FIG. 1; FIGS. 5 to 7 are views showing an inner chamber according to the headrest airbag for a vehicle shown in FIG. 1; and FIG. 8 is a view showing a rear cushion of the headrest airbag for a vehicle shown in FIG. 1.

As shown in FIGS. 1 to 2, a headrest airbag for a vehicle according to the present invention may include a pair of airbag cushions 100 disposed in a headrest 10, deployed forward from opposite sides of an occupant's head by being supplied with gas from an inflator 12, and having front end portions thereof that protrude to face each other when deployed. In other words, the airbag cushion 100 of the present invention may be disposed in the headrest 10, and a pair of airbag cushions may be provided and deployed forward from the opposite sides of the headrest 10. The airbag cushions 100 may be deployed at the opposite sides of the occupant's head, and may have the front end portions thereof protrude to face each other when deployed, to be disposed to surround the occupant's head.

As described above, since the airbag may be deployed on the opposite sides of the headrest 10 of the vehicle and surround the occupant's head, the occupant's head movement may be minimized and the occupant's head may be protected against impact in the event of a collision in any direction, such as frontal collision, side collision, oblique collision, whereby it may be possible to protect the occupant more safely. In particular, as shown in FIGS. 2 to 3, the airbag cushion 100 may include: an outer chamber 120 disposed at a side of the occupant's head when deployed by being supplied with the gas from the inflator 12; and an inner chamber 140 disposed in a front end portion of the outer chamber 120, deployed by being supplied with the gas from the outer chamber 120, and disposed in front of the occupant's head when deployed.

As described above, the airbag cushion 100 may include a pair of the outer chamber 120 and the inner chamber 140, and the outer chamber 120 may be disposed at the side of the occupant's head when deployed by being supplied with the gas from the inflator 12 in the headrest 10. The front end portion of the outer chamber 120 may include the inner chamber 140 configured to be deployed to face the other outer chamber 120, and the inner chamber 140 may be disposed in front of the occupant's head when deployed by being supplied with the gas from the outer chamber 120. Accordingly, in the event of a vehicle collision, the occupant's head may be surrounded by the outer chamber 120 and the inner chamber 140, whereby the occupant's head movement may be minimized and the occupant's head may be protected against impact.

Particularly, as shown in FIG. 4, the outer chamber 120 may include a plurality of sealing portions that extend in forward and backward directions and spaced apart from each other in a vertical direction. The sealing portions 122 may be formed when opposite surfaces of the outer chamber 120 are sewed together, wherein the portion where the sealing portions 122 are formed becomes a dead zone. Accordingly, as the outer chamber 120 may be formed with the sealing portions 122 to fix the opposite surfaces thereof, bearing capacity may be generated in the deployed outer chamber 120, whereby excessive inflation may be prevented. Particularly, as the sealing portions 122 are formed in the outer chamber 120 by extending in the forward and backward directions, the gas delivered from the inflator 12 may be moved forward more smoothly. Herein, the forming position and the number of the sealing portions 122 formed in the outer chamber 120 may be determined based on the bearing capacity that the airbag cushion 100 should secure and the deployment shape thereof.

Meanwhile, as shown in FIG. 3, a diaphragm 160 may be disposed between the outer chamber 120 and the inner chamber 140, and the diaphragm 160 may include at least one communication aperture 162. In particular, the airbag cushion 100 may be divided into the outer chamber 120 and the inner chamber 140 by the diaphragm 160, and the diaphragm 160 may be formed with the communication aperture 162, and thus, the inner chamber 140 may be inflated after the outer chamber 120 is inflated. Unless the diaphragm 160 is provided, the inner chamber 140 may be inflated first prior to the outer chamber 120 being fully inflated, and thus, the inner chamber 140 may hit the occupant.

Therefore, since the gas flow rate is adjusted by the communication aperture 162 formed in the diaphragm 160, the outer chamber 120 and the inner chamber 140 may be sequentially inflated. The communication aperture 162 may be disposed at the front of the diaphragm 160 to allow the gas introduced from the rear of the outer chamber 120 to sufficiently inflate the outer chamber 120 and then moved to the inner chamber 140 through the communication aperture 162. Further, according to deployment timing of the inner chamber 140, one communication aperture 162 may be provided as shown in FIG. 4, or a plurality of communication apertures may be provided as shown in FIG. 5.

Moreover, as shown in FIGS. 6 to 7, the inner chamber 140 may include a plurality of inner tethers 142 on an inner surface thereof to limit inflation of the inner chamber 140 by being connected to the diaphragm 160. Accordingly, since the inner chamber 140 may be connected to the diaphragm 160 by the inner tethers 142, the bearing capacity may be generated when the inner chamber 140 is deployed, whereby excessive inflation may be prevented. Particularly, the deployment shape of the inner chamber 140 may be determined according to the installation position and the length of the inner tethers 142, and the deployment shape may be maintained by the inner tethers 142.

The inner tethers 142 may form a dead zone of the inner chamber 140, and as shown in FIG. 4, may be positioned to be distributed around the communication aperture 162 formed in the diaphragm 160, or as shown in FIG. 5, may extend in a vertical direction while being spaced apart from each other in the forward and backward directions. In other words, the deployment shape of inner chamber 140 may be formed in various shapes based on the position, the length, and the number of the inner tethers 142 connected to the inner chamber 140. As shown in FIG. 6, a plurality of inner tethers 142 may be spaced apart from each other in the forward and backward directions, and lengths of the inner tethers 142 may be gradually increased in order from a rear tether to a front tether.

Accordingly, since a plurality of inner tethers 142 may be spaced apart from each other in the forward and backward directions in the inner chamber 140, and lengths of the inner tethers 142 may be gradually increased in order from a rear tether to a front tether, the length of an inner tether 142 disposed at the rearmost side is the shortest, and the length of an inner tether 142 disposed at the foremost side is the longest. Thus, the inner chamber 140 may have a gradually inclined shape when deployed and may be deployed to surround the occupant's head since the front end portion thereof protrudes the longest in the outer chamber 120. As shown in FIG. 2, the inner chamber 140 may be inflated to have a deployment shape where the front portion thereof protrudes toward the front of the occupant's head.

As shown in FIGS. 6 to 7, a vent aperture 144 may be disposed at the front end portion of the inner chamber 140 and may be configured to communicate with the outside. In particular, the inner chamber 140 may include: a closing membrane 146 configured to close the vent aperture 144; and a pulling tether 148 having a first end thereof connected to the closing membrane 146 and a second end thereof connected to the diaphragm 160, and thus, the vent aperture 144 may be closed by the closing membrane 146 being pulled when the inner chamber 140 is inflated. Accordingly, at the front end portion of the inner chamber 140, the vent aperture 144 may be formed to allow the gas to be discharged to the outside. When the occupant's head is moved and comes into contact with the inner chamber 140 while the inner chamber 140 is deployed, the gas in the inner chamber 140 may be discharged through the vent aperture 144, whereby an injury caused by the deployment force of the inner chamber 140 may be prevented, and the shock may be absorbed.

Particularly, when deployed, the inner chamber 140 should support the occupant's head movement. Therefore, the inner chamber 140 may include the closing membrane 146 configured to close the vent aperture 144, and the pulling tether 148 configured to pull the closing membrane 146 to close the vent aperture 144 when the inner chamber 140 is deployed. In other words, at the beginning of the deployment of the inner chamber 140, the vent aperture 144 remains open, and as the pulling force of the pulling tether 148 is transmitted to the closing membrane 146 when the inner chamber 140 is deployed, the closing membrane 146 closes the vent aperture 144, and thus, the gas in the inner chamber 140 may be prevented from being discharged outside. Accordingly, the inner chamber 140 may be maintained in an inflated state, and thus, the bearing capacity that limits the occupant's head movement may be secured.

In the operation of closing the vent aperture 144 by the closing membrane 146 and the pulling tether 148, at the beginning of the deployment of the inner chamber 140, the pulling tether 148 may be loose, and thus, the closing membrane 146 may be separated from the vent aperture 144. When the inner chamber 140 is then deployed, the pulling tether 148 is pulled and accordingly the closing membrane 146 is pulled to come into contact with the vent aperture 144, whereby the vent aperture 144 is closed.

Moreover, as shown in FIGS. 2 and 3, the airbag cushion 100 may further include an inner support tether 170 having a first end thereof connected to an outer surface of the inner chamber 140 and a second end thereof fixed to the headrest 10, thereby providing a pulling force to pull the inner chamber 140 toward an occupant side when the airbag cushion 100 is inflated. Further, the airbag cushion 100 may further include an outer support tether 180 having a first end thereof connected to an outer surface of the outer chamber 120 and a second end thereof fixed to the headrest 10, thereby providing a pulling force to pull the outer chamber 120 toward an occupant side when the airbag cushion 100 is inflated. In particular, the connection of the inner support tether 170 and the outer support tether 180 to the headrest 10 may indicate that the components are connected to a housing 14 provided in the headrest 10 or connected to a headrest frame.

In the present invention, the airbag cushion 100 should be disposed to surround the occupant's head when deployed.

However, when the gas is supplied to the airbag cushion 100 from the inflator 12, the airbag cushion 100 may be inflated while being moved in an unspecified direction away from the occupant's head. When the airbag cushion is distant from the occupant's head, the amount of the occupant's unintentional head movement may be increased. Accordingly, the inner chamber 140 of the airbag cushion 100 may be pulled toward the occupant by the inner support tether 170, and the outer chamber 120 may be pulled toward the occupant by the outer support tether 180, to dispose the inner chamber 140 and the outer chamber 120 to surround the occupant's head, thereby increasing the support.

As shown in FIG. 2, the inner support tether 170 and the outer support tether 180 connected to the headrest 10 may be connected to the headrest 10 inwardly toward the airbag cushion 100, and thus, the inner chamber 140 and the outer chamber 120 may be pulled toward the occupant's head when the airbag cushion 100 is deployed, thus preventing the airbag cushion from being inflated in a direction away from the occupant's head. Each of the inner support tether 170 and the outer support tether 180 may have a length thereof set to allow the inner chamber 140 and the outer chamber 120 to surround the occupant's head when the airbag cushion 100 is deployed, and the specific length thereof may be set according to an expansive force applied when inflated to secure a bearing capacity.

Moreover, as shown in FIGS. 3 and 8, the headrest airbag may further include the housing 14 disposed inside the headrest 10 with the inflator 12 and the airbag cushion 100 provided therein. In particular, the inflator 12 may be disposed at the center inside the housing 14, the airbag cushions 100 may be disposed at inner opposite sides of the housing 14, and a gas passage 12a that extends from the inflator 12 may be connected to the airbag cushion 100. The housing 14 may be disposed inside the headrest 10, the housing 14 may be fixed to a frame of the headrest 10, and the inflator 12 and the airbag cushion 100 may be disposed inside the housing. Additionally, the inflator 12 may be disposed at the center inside the housing 14 to evenly supply the gas to the airbag cushions 100 at the opposite sides of the headrest 10, and the airbag cushions 100 may be deployed toward the opposite sides of the occupant's head by being supplied with the gas of the inflator 12 from the opposite sides of the housing 14.

Particularly, the housing 14 may include a guide portion 14a that extends forward, with a front portion of the guide portion being open. In other words, the airbag cushions 100 may be disposed at the opposite sides of the housing 14, and the airbag cushions 100 should be deployed forward. Thus, the guide portion 14a with the front portion thereof being open may be disposed at opposite sides of the housing 14 to deploy the airbag cushions 100 forward. The guide portion 14a extends forward to guide the airbag cushion 100 to be deployed forward.

Meanwhile, the headrest airbag may further include a rear cushion 200 disposed at a rear end portion of the housing 14, configured to communicate with the gas passage 12a to be supplied with the gas from the inflator 12, and configured to be deployed backward from the headrest 10. The rear cushion 200 may be disposed at the rear end portion of the housing 14 and may be deployed backward by being supplied with the gas from the inflator 12, thereby protecting a head of a rear seat occupant. The rear cushion 200 may be configured to communicate with the gas passage 12a to be inflated along with the airbag cushion 100 by being supplied with the gas from the inflator 12, and may be deployed backward to absorb shock to prevent the head of the rear seat occupant from hitting the headrest 10. Herein, the capacity of the inflator 12 may be set to inflate both the airbag cushion 100 and the rear cushion 200, and a plurality of inflators 12 may be provided to sufficiently supply gas to the airbag cushion 100 and the rear cushion 200.

Meanwhile, the rear cushion 200 may include at least one fixed tether 220 disposed therein and a first end of the fixed tether may be connected to an inner surface of the rear cushion 200 and a second end thereof may be connected to the rear end portion of the housing 14, thereby limiting inflation of the rear cushion 200. Since the rear cushion 200 may be connected to the headrest 10 by the fixed tether 220, bearing capacity may be generated when the rear cushion 200 is deployed, whereby excessive inflation may be prevented. Particularly, the deployment shape of the rear cushion 200 may be determined according to the installation position and the length of the fixed tether 220, and the deployment shape may be maintained by the fixed tether. Further, the rear cushion 200 may be disposed at each of opposite ends thereof with an aperture 240 (e.g., through-hole) configured to communicate with the outside to discharge the gas therethrough.

As described above, the rear cushion 200 may be formed with the aperture 240 at each of the opposite ends thereof, to discharge the gas in the rear cushion 200 outside. Accordingly, when the head of the rear seat occupant is moved and comes into contact with the rear cushion 200 while the rear cushion 200 is deployed, the gas in the rear cushion 200 may be discharged through the aperture 240, thereby absorbing shock caused when the head of the rear seat occupant comes into contact with the rear cushion.

Additionally, the gas passage 12a may have a portion thereof that extends toward the airbag cushions 100 and is formed to be wide and a portion thereof that extends toward the rear cushion 200 and is formed to be narrow. In other words, the gas passage 12a may be formed such that the airbag cushion 100 and the rear cushion 200 are deployed by one inflator 12, wherein gas may be supplied to the rear cushion 200 first due to the installation position of the inflator 12. Accordingly, the gas passage 12a may have a first portion thereof that extends toward the airbag cushions 100 and is formed to be wide to allow the gas from inflator 12 to be sufficiently supplied to the airbag cushion 100 and a second portion thereof that extends toward the rear cushion 200 and is formed to be narrow to allow the amount of the gas supplied to the rear cushion 200 to be minimal. Accordingly, since the deployment rates of the airbag cushion 100 and the rear cushion 200 are adjusted, both the airbag cushion 100 and the rear cushion 200 may be deployed in an appropriate timing to thus protect the occupant's head.

According to the headrest airbag for a vehicle configured as described, since the airbag cushion 100 may be deployed forward from the headrest to surround an occupant's head, the occupant's head movement may be minimized by holding the occupant's head in advance, and the occupant's head may be protected against impact. Further, since the rear cushion 200 may be deployed backward from the headrest, both a front seat occupant and a rear seat occupant may be safely protected from impact by preventing an injury caused when the rear seat occupant hits the front seat.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A headrest airbag for a vehicle, comprising:
a pair of airbag cushions disposed in a headrest,
wherein the airbag cushions are deployed forward from opposite sides of an occupant's head by being supplied with gas from an inflator,
wherein the airbag cushions have front end portions that protrude to face each other when deployed, and
wherein each of the airbag cushions includes:
an outer chamber disposed at a side of the occupant's head when deployed by being supplied with the gas from the inflator; and
an inner chamber disposed in a front end portion of the outer chamber, deployed by being supplied with the gas from the outer chamber, and disposed in front of the occupant's head when deployed.

2. The headrest airbag of claim 1, wherein the outer chamber includes a plurality of sealing portions that extend in forward and backward directions and are spaced apart from each other in a vertical direction.

3. The headrest airbag of claim 1, wherein a diaphragm is disposed between the outer chamber and the inner chamber, and the diaphragm includes at least one communication aperture.

4. The headrest airbag of claim 3, wherein the inner chamber includes a plurality of inner tethers on an inner surface thereof to limit inflation of the inner chamber by being connected to the diaphragm.

5. The headrest airbag of claim 4, wherein the plurality of inner tethers are spaced apart from each other in the forward and backward directions, and lengths of the inner tethers are gradually increased in order from a rear inner tether to a front inner tether.

6. The headrest airbag of claim 3, wherein a vent aperture is disposed at a front end portion of the inner chamber and the vent aperture is configured to communicate with an outside, and the inner chamber includes a closing membrane configured to close the vent aperture, and a pulling tether having a first end thereof connected to the closing membrane and a second end thereof connected to the diaphragm to close the vent aperture by the closing membrane being pulled when the inner chamber is inflated.

7. The headrest airbag of claim 1, wherein each of the airbag cushions further includes:
an inner support tether having a first end thereof connected to an outer surface of the inner chamber and a second end thereof fixed to the headrest to provide a pulling force and the inner chamber is pulled toward an occupant side when the airbag cushion is inflated.

8. The headrest airbag of claim 1, wherein each of the airbag cushions further includes:
an outer support tether having a first end thereof connected to an outer surface of the outer chamber and a second end thereof fixed to the headrest to provide a pulling force and the outer chamber is pulled toward an occupant side when the airbag cushion is inflated.

9. The headrest airbag of claim 1, further comprising:
a housing disposed in the headrest, with the inflator and the airbag cushions disposed therein,
wherein the inflator is disposed in a center inside the housing, the airbag cushions are disposed at inner opposite sides of the housing, and a gas passage that extends from the inflator is connected to the airbag cushions.

10. The headrest airbag of claim 9, wherein the housing includes a guide portion that extends forward, with a front portion of the guide portion being open.

11. The headrest airbag of claim 9, further comprising:
a rear cushion disposed at a rear end portion of the housing, configured to communicate with the gas passage to be supplied with the gas from the inflator, and configured to be deployed backward from the headrest.

12. The headrest airbag of claim 11, wherein at least one fixed tether is disposed in the rear cushion and the at least one fixed tether has a first end connected to an inner surface of the rear cushion and a second end connected to the rear end portion of the housing to limit inflation of the rear cushion.

13. The headrest airbag of claim 11, wherein an-aperture is disposed at each of opposite ends of the rear cushion and the aperture is configured to communicate with an outside to discharge the gas therethrough.

14. The headrest airbag of claim 11, wherein the gas passage has a first portion that extends toward the airbag cushions and is formed to be wide and a second portion that extends toward the rear cushion and is formed to be narrower than the first portion.

* * * * *